United States Patent [19]

Yamaguchi et al.

[11] Patent Number: 4,766,773
[45] Date of Patent: Aug. 30, 1988

[54] GEAR TYPE TRANSMISSION UNIT

[75] Inventors: Touhei Yamaguchi; Kazuhiko Moriyama; Ethuo Shira, all of Hiroshima, Japan

[73] Assignee: Mazda Motor Corporation, Hiroshima, Japan

[21] Appl. No.: 901,588

[22] Filed: Aug. 29, 1986

[30] Foreign Application Priority Data

Aug. 31, 1985 [JP] Japan .............. 60-133283[U]
Aug. 31, 1985 [JP] Japan .............. 60-133285[U]

[51] Int. Cl.$^4$ ............................................. F16H 57/04
[52] U.S. Cl. ................................. 74/467; 184/6.12
[58] Field of Search ............ 74/467, 606 R, 345, 74/352, 360, 362, 363, 374, 375; 184/6.12, 11.1, 11.2, 11.3, 13.1

[56] References Cited

U.S. PATENT DOCUMENTS

| | | | |
|---|---|---|---|
| 3,383,947 | 5/1968 | Higgins | 74/606 R |
| 3,645,147 | 2/1972 | Fodrea | 74/375 |
| 3,785,458 | 1/1974 | Caldwell et al. | 74/467 X |
| 4,170,152 | 10/1979 | Windish et al. | 74/606 R |
| 4,221,279 | 9/1980 | Jones et al. | 74/467 X |
| 4,317,386 | 3/1982 | Ida et al. | 74/467 |
| 4,327,598 | 5/1982 | Yoneda et al. | 74/467 |
| 4,347,756 | 9/1982 | Sogo | 74/467 |
| 4,359,142 | 11/1982 | Schultz et al. | 74/467 X |
| 4,368,802 | 1/1983 | Grabill et al. | 184/6.12 |
| 4,616,526 | 10/1986 | Morisawa et al. | 74/606 R |

FOREIGN PATENT DOCUMENTS

| | | | |
|---|---|---|---|
| 270523 | 2/1963 | Australia | 184/6.12 |
| 148639 | 7/1985 | European Pat. Off. | 74/467 |
| 56146159 | 4/1955 | Japan . | |
| 103151 | 8/1980 | Japan | 74/467 |
| 59060 | 5/1981 | Japan | 74/467 |
| 163860 | 9/1983 | Japan | 74/467 |
| 58-135557 | 9/1983 | Japan . | |

*Primary Examiner*—Leslie A. Braun
*Assistant Examiner*—Dwight G. Diehl
*Attorney, Agent, or Firm*—Burns, Doane, Swecker & Mathis

[57] ABSTRACT

A gear type transmission unit which includes a transmission unit housing, a bearing retainer mounted at a front wall portion of the transmission unit housing, and a first bearing held in the bearing retainer for supporting an input shaft, and is characterized by an upper portion of a bearing holding portion of the bearing retainer, formed to project toward the side of a gear speed changing mechanism. This projecting upper portion is formed with an oil groove for lubricating oil introduction, communicated with an oil hole for bearing lubrication formed in the bearing retainer.

8 Claims, 5 Drawing Sheets

GEAR TYPE TRANSMISSION UNIT

BACKGROUND OF THE INVENTION

The present invention generally relates to a gear type transmission unit or speed change gear unit, and more particularly, to a construction thereof around a bearing retainer mounted at a front wall portion of a housing of the transmission unit, and also to a lubricating arrangement in an extension housing provided at the rear end portion of the transmission unit housing.

Generally, in a gear type transmission unit for a motor vehicle, a bearing retainer is mounted on an opening formed at a front wall of a transmission unit housing so as to rotatably support an input shaft through a bearing held in said bearing retainer, while one end of said input shaft is connected to an output shaft of said transmission unit through another bearing for relative rotation therewith.

Incidentally, in a transmission unit of the above described type, it is so arranged that lubricating oil collected at the bottom portion of the transmission unit housing is raised or picked up through rotation of various speed changing gears provided in said housing so as to be fed to respective lubricating portions such as the bearing portions, etc. referred to earlier, but in the above case, there is a tendency that the lubricating oil is not sufficiently distributed to the vicinity of such bearing portions due to the positional relation thereof.

In order to overcome the inconvenience as described above, there has conventionally been proposed a technique disclosed, for example, in Japanese Utility Model Laid-Open Application Jikkaisho No. 56-146159 in which an oil receiver is provided at the side of a speed change gear mechanism, on a front wall of the transmission unit housing, while oil holes for communicating the peripheral portion of the bearing held in the bearing retainer for supporting the input shaft, with the oil receiver are formed in said front wall so that the oil picked up in the transmission unit housing is introduced into the bearings through said oil holes. By the above arrangement, since the lubricating oil is positively guided even to the peripheral portions of the bearings at the front wall side of the transmission unit housing where such lubricating oil is rather difficult to be distributed, insufficient lubrication for such bearings may be eliminated.

However, since the technique disclosed in said Japanese Utility Model Laid-Open Application Jikkaisho No. 56-146159 requires to integrally form the oil holes and oil receiver on a large sized workpiece such as the transmission unit housing, there is such a problem that processing thereof is relatively difficult.

Meanwhile, for example, in a manually operated transmission unit for a motor vehicle, an extension housing is provided at one end of the transmission unit housing, and at the rear end portion of said extension housing, a front end of a propeller shaft is relatively movable coupled to a rear end of an output shaft. At the front end side of the extension housing, the output shaft is journalled at its intermediate portion through a bearing provided at the forward wall of said extension housing, while at the rear end side of said housing, the front end of said propeller shaft, i.e., the coupling portion between said propeller shaft and the output shaft is journalled through a sleeve or the like. In the above case, to achieve sufficient lubrication for the above two bearing portions, it is also arranged that the lubricating oil collected at the bottom portion of the transmission unit housing and picked up by the speed changing gears is supplied to the bearing at the front end side of the extension housing. However, in the case of the bearing portion at the rear end of said extension housing which is located at a position relatively spaced from the transmission unit housing, it is impossible to spread splashes of the lubricating oil up to such bearing portion merely through picking up of the oil by the speed changing gears, and therefore, it is necessary to separately provide some other means to lead the lubricating oil to said bearing portion.

As one example of such lubricating oil leading means referred to above, there has conventionally been disclosed in Japanese Utility Model Laid-Open Application Jikkaisho No. 58-135557, a lubricating device in which, in a construction wherein a laterally projecting cylindrical portion accommodating therein a rotating shaft through a bearing is provided on a transmission unit case containing therein speed changing gears and lubricating oil, at a position above the level of the lubricating oil, there is provided a shielding member projecting upwardly from the bottom face of the cylindrical portion by a predetermined distance at the end portion of said cylindrical portion adjacent to the side of the transmission unit case. By the above arrangement, the lubricating oil flowing into the cylindrical portion by the picking up action of the speed changing gears is blocked by said shielding member so as to be collected in said cylindrical portion, and therefore, the lubricating oil may be sufficiently supplied into the forward end portion of the cylindrical portion spaced from the transmission unit casing for positive lubrication of the bearing for the rotating shaft located at such forward end portion.

However, when the means as described above is employed for the extended portion referred to earlier, the number of parts is increased by the provision of the shielding member, thus resulting in a cost increase to that extent.

In addition, in the conventional arrangements, there has been known such a construction in which a rib or conduit for introduction of the lubricating oil is provided at a ceiling portion in the extension housing so as to lead the lubricating oil picked up within the transmission unit housing toward the bearing portion at the rear end portion of the extension housing through the rib or conduit. However, in the case of the rib, the lubricating oil tends to drip off before reaching the bearing portion, thus resulting in an insufficient lubrication, while in the case of the conduit, the structure at the ceiling portion of the extension housing is undesirably complicated.

SUMMARY OF THE INVENTION

Accordingly, an essential object of the present invention is to provide an improved gear type transmission unit which is readily processed for manufacture, and capable of positively supplying a sufficient amount of lubricating oil to bearing portions and therearound through improvement of construction of a bearing retainer to be mounted on a front wall of a transmission unit housing, in order to eliminate the disadvantages related to the construction around the input shaft supporting bearings in the conventional gear type transmission units.

Another important object of the present invention is to provide a transmission unit of the above described type which is capable of positively lubricating the bearing portion at the rear end of the extension housing through a simple lubricating construction in order to cope with the problems related to the lubricating construction at the extended portion in the conventional transmission units of this kind.

In accomplishing these and other objects, according to one aspect of the present invention, there is provided a gear type transmission unit which includes a transmission unit housing, a bearing retainer mounted at a front wall portion of the transmission unit housing, and a first bearing held in the bearing retainer for supporting an input shaft, and is characterized by an upper portion of a bearing holding portion of the bearing retainer, formed to project toward the side of a gear speed changing mechanism, with the projecting upper portion being formed with an oil groove for lubricating oil introduction, communicated with an oil hole for bearing lubrication, formed in the bearing retainer.

By the construction of the present invention as described above, when the lubricating oil collected in the inner bottom portion of the transmission unit housing is picked up by the speed changing gears within said housing, part of such lubricating oil is received by the oil groove in the projecting portion of the bearing retainer so as to be led into the bearing lubricating oil hole formed in said bearing retainer, and thus, positively led into the bearing held in said retainer or thereabout for sufficient lubrication of such lubricating portion.

Particularly, according to the present invention, since the oil groove and oil hole which constitute the lubricating oil introducing means for the above bearing are arranged to be integrally formed with the bearing retainer much smaller in size than the transmission unit housing, processing therefor has been markedly facilitated as compared with the conventional construction in which the lubricating oil introducing means of this kind is integrally formed with the transmission unit housing.

According to another aspect of the present invention, the gear type transmission unit further comprises an extension housing provided at the end portion thereof opposite to the front wall portion of the transmission unit housing. The extension housing further includes a forward wall and a fourth bearing provided in the forward wall for supporting the output shaft, and the fourth bearing is composed of a seal bearing, while the forward wall of the extension housing is formed with an oil discharge opening in a position around the outer periphery of the seal bearing at a height corresponding to that of a bearing portion in the rear end portion of the extension housing, and also, formed with an oil introducing opening for leading the lubricating oil into the extension housing, in a position around the outer periphery of the seal bearing at a height above the oil discharge opening.

By the above construction, part of the lubricating oil is introduced into the extension housing through the oil introducing opening in the forward wall of the extension housing from the side of said transmission unit housing. In the above case, since the output shaft supporting bearing on the forward wall of the extension housing is composed of the seal bearing, the level of the lubricating oil collected in said extension housing reaches the height of the bearing portion provided at the rear end portion of said housing for positive lubrication of said bearing portion. The excessive oil passing over the bearing portion at the rear end portion of said extension housing is discharged into the transmission unit housing through the oil discharge opening at the forward wall of the extension housing.

Owing to the above construction, by merely forming the two openings for the oil introduction and oil discharge in the forward wall of the extension housing, it becomes possible to keep the level of the lubricating oil flowing in from the transmission unit housing, at the height of the bearing portion in the rear end portion of the housing at all times, whereby such bearing portion can be positively lubricated through simple construction without provision of any oil introducing rib and conduit or oil storing shielding member, etc. within the extension housing.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
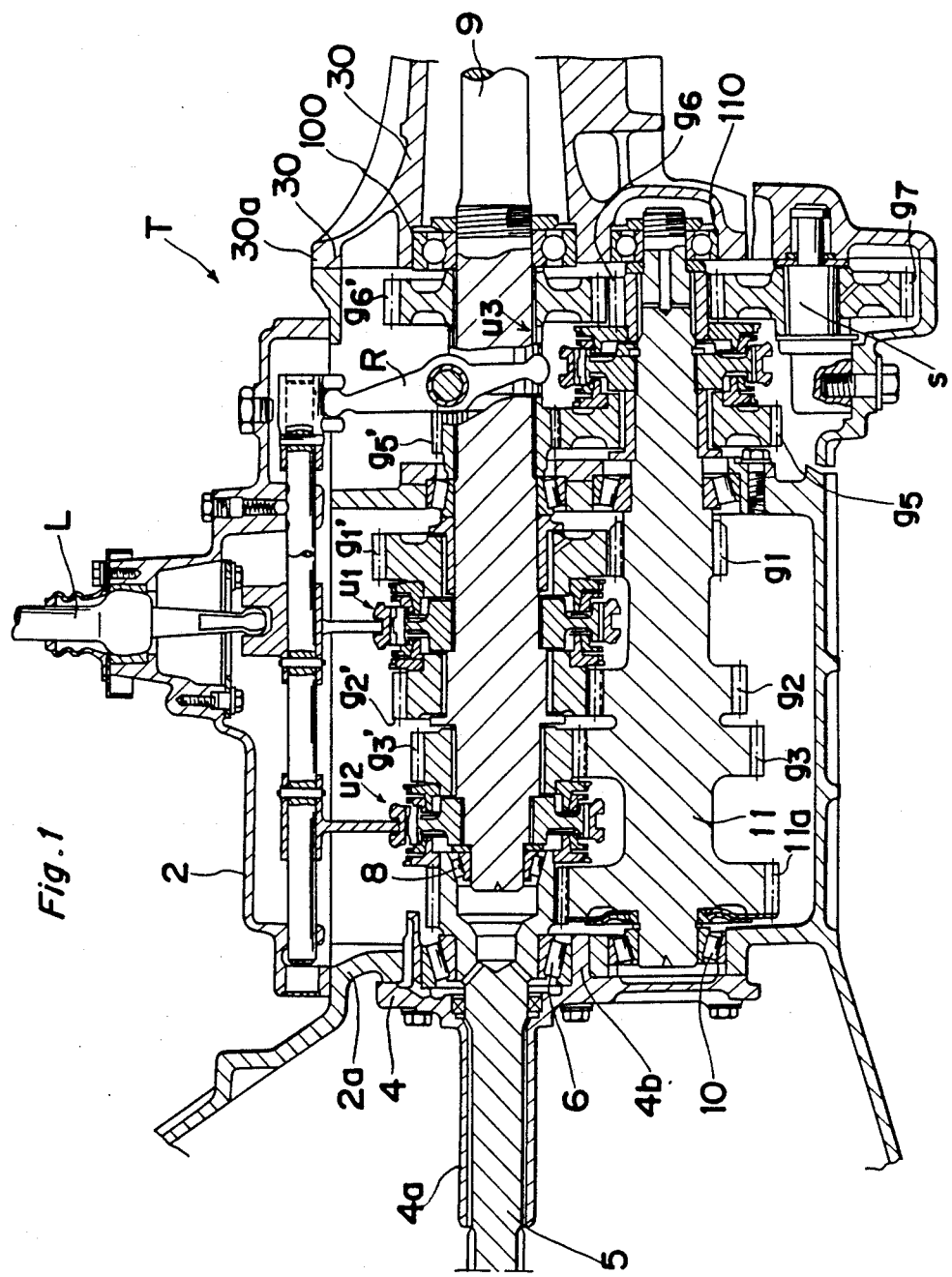
FIG. 1 is a side sectional view showing an overall construction of a gear type transmission unit to which the present invention may be applied.

Before the description of the present invention proceeds, it is to be noted that like parts are designated by like reference numerals throughout the accompanying drawings.

Referring now to the drawings, there is shown in FIG. 1, an overall construction of a gear type transmission unit to which the present invention may be applied.

Briefly described, the transmission unit T in FIG. 1 generally includes an input shaft 5, a counter shaft 11 to be rotated in association with said input shaft 5, a plurality of first speed changing gears $g_1$, $g_2$, $g_3$, $g_5$ and $g_6$ provided on said counter shaft 11, an output shaft 9 provided with a plurality of second speed changing gears $g_1'$, $g_2'$, $g_3'$, $g_5'$ and $g_6'$ to be respectively engaged with said first speed changing gears $g_1$, $g_2$, $g_3$, $g_5$ and $g_6$, another idle gear $g_7$ rotatably fitted on an idle shaft S so as to be engaged with said gear $g_6$, synchronizing devices $U_1$, $U_2$ and $U_3$ through which power transmission passages from said first speed changing gears to said second speed changing gears are selected by the operation of a shift lever L associated therewith so as to transmit rotation of said input shaft 5 to the output shaft 9 via said first and second speed changing gears thus selected. Of the first speed changing gears $g_1$, $g_2$, $g_3$, $g_5$ and $g_6$ provided on the above counter shaft 11, the counter-overdrive gear $g_5$ (fifth speed first gear) and the counter-reverse gear $g_6$ (first gear for reverse) are disposed side by side so as to be rotatable with respect to the counter shaft 11, with the latter gear $g_6$ being located at the side of an extension housing 30.

Between the gears g5 and g6, the synchronizing device U3 is disposed for causing either one of said gears g5 or g6 to be selectively coupled to the counter shaft 11, while said synchronizing device U3 is arranged to be selectively coupled to the shift level L through a reversing level R.

With particular reference to FIGS. 2 through 5, the transmission unit T according to the present invention will be described in more detail hereinbelow.

Figure 2:
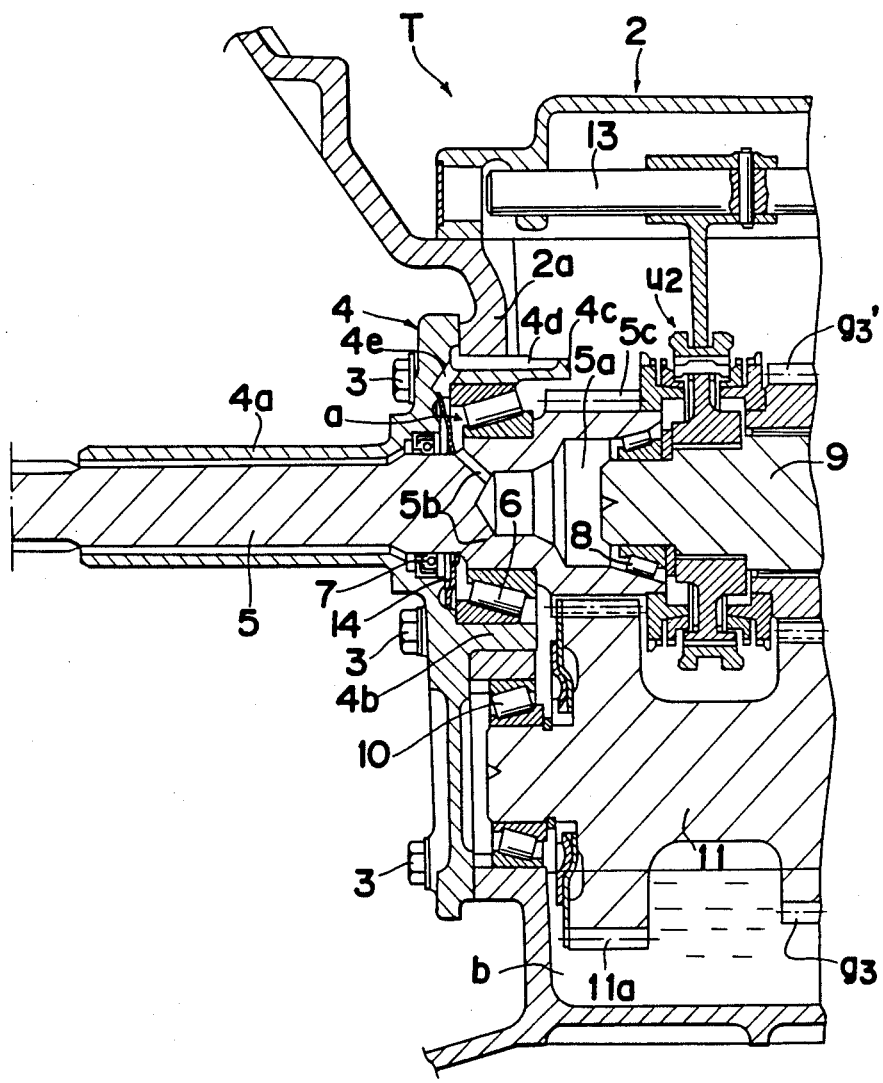
FIG. 2 is a fragmentary sectional view showing on an enlarged scale, a left side portion of the transmission unit of FIG. 1.

As shown in FIG. 2, the transmission unit T further includes a bearing retainer 4 mounted on a front wall portion 2a of the housing 2 by a plurality of fixing bolts 3. The bearing retainer 4 is formed with a cylindrical portion 4a projecting outwardly (toward the left side in FIG. 2) from its front face side to allow the input shaft 5 to rotatably pass therethrough, and a bearing holding portion 4b provided at its rear face side (inside the housing 2) and fitted therein with a first bearing 6 for support said input shaft 5. Between the front face of said first bearing 6 and the bearing retainer 4, there is provided a clearance "a", while a sealing member 7 is inserted between said bearing retainer 4 and input shaft 5. The input shaft 5 is connected at its forward end to an output shaft of an engine (not shown) through a clutch (not shown), while the rear end of said input shaft 5 is formed into a hollow portion 5a, which is communicated with said clearance "a" through a plurality of communicating holes 5b formed in said input shaft 5.

Within the transmission unit housing 2, there are provided the output shaft 9 concentrically disposed at the rear side of the input shaft 5, and connected, at its forward end, to the rear end of said input shaft 5 through a second bearing 8 for relative rotation, and the counter shaft 11 disposed under the output shaft 9 in parallel relation therewith, and rotatably supported at its forward end, by the front wall portion 2a of the housing 2 through a third bearing 10, with a predetermined amount of lubricating oil "b" being accommodated at the bottom portion of said housing 2. The counter shaft 11 is rotated in association with the rotation of the input shaft 5 at all times by the engagement of an input gear 11a integrally formed at the forward end portion of the counter shaft 11 with a driving gear 5c provided as one unit at the rear end portion of said input shaft 5, and in the above case, the lubricating oil "b" collected at the bottom portion within the transmission unit housing 2 is to be rapidly raised or picked up upwardly.

As referred to earlier with reference to FIG. 1, the output shaft 9 and the counter shaft 11 are respectively provided with the specific speed changing gears g1, g2, g3, g5 and g6, and g1′, g2′, g3′, g5′ and g6′ and also, with the synchronizing devices U1, U2 and U3, and thus, upon operation of the shift level L (FIG. 1), for example, through a shift rod 13 and the synchronizing device U2 associated with the lever L via suitable members, the rotation transmitting passages from the counter shaft 11 to the output shaft 9 are selectively changed over.

As a characteristic portion of the above transmission unit T according to the present invention, the bearing retainer 4 has an upper portion 4c of its bearing holding portion 4b projecting toward the inner portion of the housing 2 (i.e., toward the side of the gear speed changing mechanism) from the wall face of the front wall portion 2a of said transmission unit housing 2. In the above bearing retainer 4, an oil groove 4d for the introduction of theI lubricating oil is formed on the upper face side of said upper projection portion 4c, while a lubricating oil hole 4e for communicating said clearance "a" with said oil groove 4d is also provided. More specifically, in the case where the lubricating oil "b" picked up within the housing 2 has flowed into said oil groove 4d, said lubricating oil is introduced into the clearance "a" through the oil hole 4e so as to be fed to the first bearing 6, and after having lubricated the first bearing 6, is further fed to the third bearing 10 located thereunder, while, from the clearance "a", the lubricating oil "b" is also fed to the second bearing 8 though the communicating holes 5b and the hollow portion 5a of the input shaft 5. Of course, the lubricating oil "b" can be directed to the third bearing 10 by numerous means and arrangments, for example, through the wall of the transmission casing. In any case, it is sufficient that the lubricating oil may reach the bearing 10 by any well known means. In the above case, according to the present embodiment, a guide member 14 is provided in the clearance "a", and it is so arranged that the lubricating oil "b" is positively led into the communicating holes 5b of the input shaft 5 and the first bearing 6 from the clearance "a" by said guide member 14.

By the above construction according to the present invention, the lubricating oil "b" is positively fed in the manner as described below to the first, second and third bearings 6, 8 and 10 located in positions where the lubricating oil is somewhat difficult to be distributed.

More specifically, the lubricating oil "b" picked up from the inner bottom portion of the housing 2 by the action of the gears 11a, g1, g2, g3, g5, etc. provided on the counter shaft 11, is scattered in the form of splashes toward the upper portion of the housing 2, and part of such lubricating oil directly flows into the oil groove 4d of the bearing retainer 4 in the front wall portion 2a of said housing 2, or similarly flows into said oil grooves 4d via surfaces of a ceiling and the front wall portion 2a of the transmission unit housing 2. The lubricating oil "b" thus led into the oil groove 4d is introduced into the clearance "a" through the oil hole 4e in the bearing retainer 4, and part of such lubricating oil flows into the third bearing 10 located thereunder from the clearance "a" through the first bearing 6. By the above function, the first and third bearings 6 and 10 are to be positively and sufficiently lubricated.

Meanwhile, another part of the lubricating oil introduced into the clearance "a" in the manner as described above is guided by the guide member 14 so as to be led into the communicating holes 5b in the input shaft 5 and further, flows into the second bearing 8 via the hollow portion 5a at the rear end portion of said input shaft 5, and thus, said second bearing 8 is also lubricated positively.

Furthermore, in the foregoing construction, since the oil groove 4d is formed not on the transmission housing 2 whose processing is comparatively troublesome, but on the bearing retainer 4 of a much smaller size, required processing may be effected extremely easily during manufacture.

Figure 3:
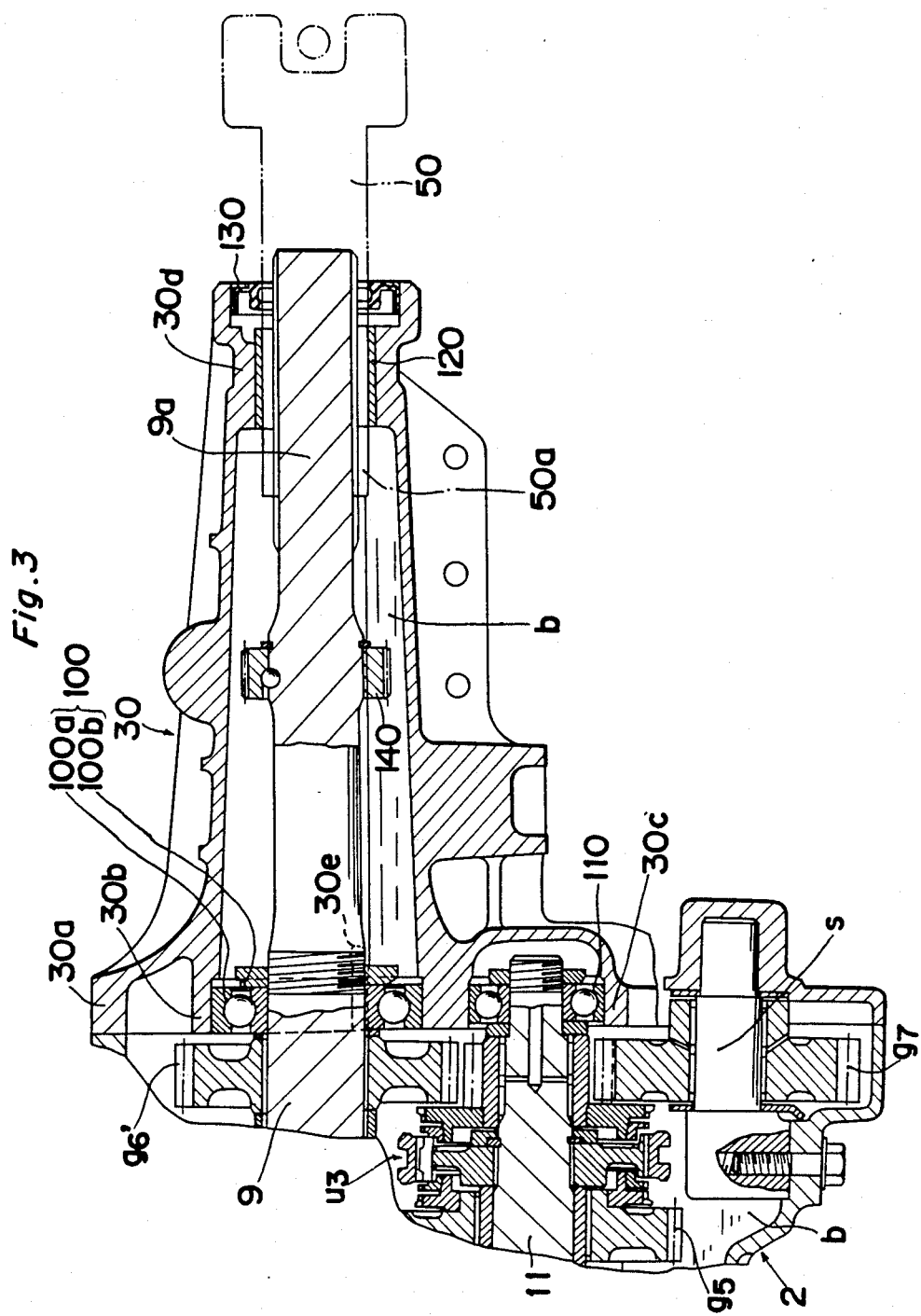
FIG. 3 is also a fragmentary sectional view showing on an enlarged scale, a right side portion of the transmission unit of FIG. 1.

As shown in FIG. 3, the transmission unit T of the present invention is further provided with the extension housing 30 at its right side end portion, and the output shaft 9 disposed at the rear side of the input shaft 5 in the housing 2 and connected at its rear end portion 9a, to a propeller shaft 50, is rotatably supported through interiors of the transmission unit housing 2 and the extension housing 30.

In the extension housing 30 as referred to above, the end face portion thereof at the side of the transmission unit housing 2 is formed into a forward wall 30a, and a fourth bearing 100 for supporting the output shaft 9 is fitted in a bearing holding portion 30b formed at the upper portion of said forward wall 30a, while a fifth bearing 110 for supporting the counter shaft 11 is similarly fitted into another bearing holding portion 30c provided below the bearing holding portion 30b. Of the above bearings 100 and 110, the fourth bearing 100 is constituted by a seal bearing including a ball bearing 100a which supports the intermediate portion of the output shaft 9 and a sealing member 100b for sealing gaps in said ball bearing 100a, whereby the lubricating oil "b" is prevented from being passed through said fourth bearing 100. Moreover, in the rear end portion 30d of said extension housing 30, another bearing member 120 in the form of a sleeve is fitted, so as to support the end portion 50a of the propeller shaft 50 connected to the rear end 9a of the output shaft 9 through said bearing member 120.

It is to be noted here that, at an open end portion in the rear end portion 30d of the extension housing 30, a sealing member 130 is provided so as to prevent the lubricating oil "b" from leaking outside, and that the forward end 50a of the propeller shaft 50 is connected to the corresponding rear end portion 9a of the output shaft 9 by spline so as to be allowed to axially move with respect to the output shaft. On the output shaft 9 in the extension housing 30, a pinion 140 for a speedometer is mounted.

Figure 4:
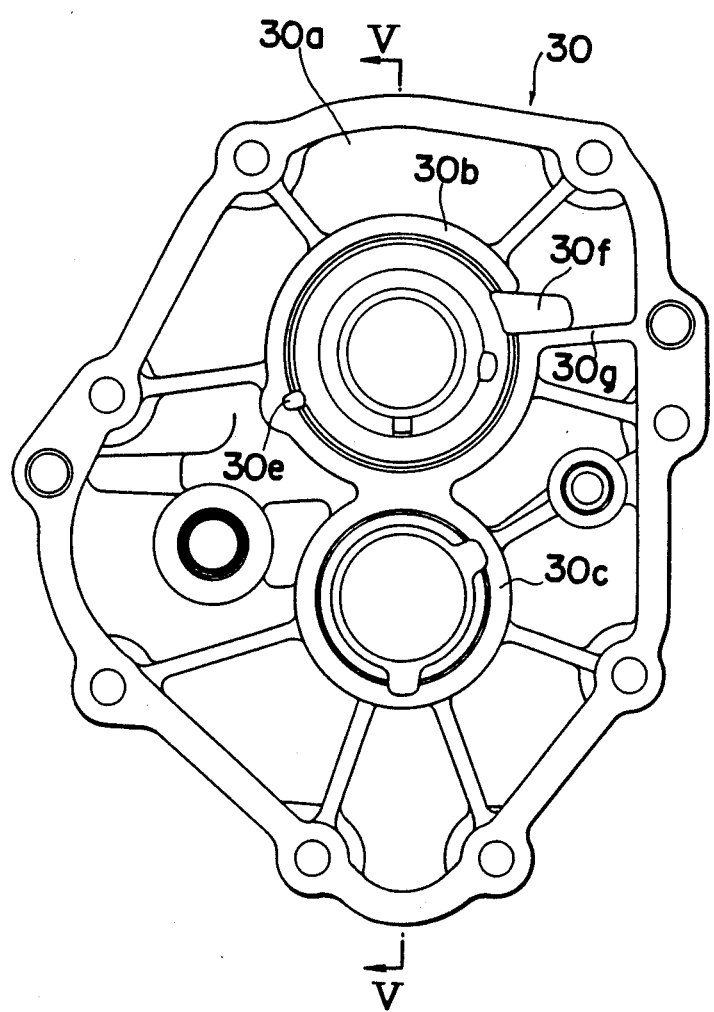
FIG. 4 is a front elevational view showing a single unit of an extension housing employed in the transmission unit of FIG. 1.
Figure 5:
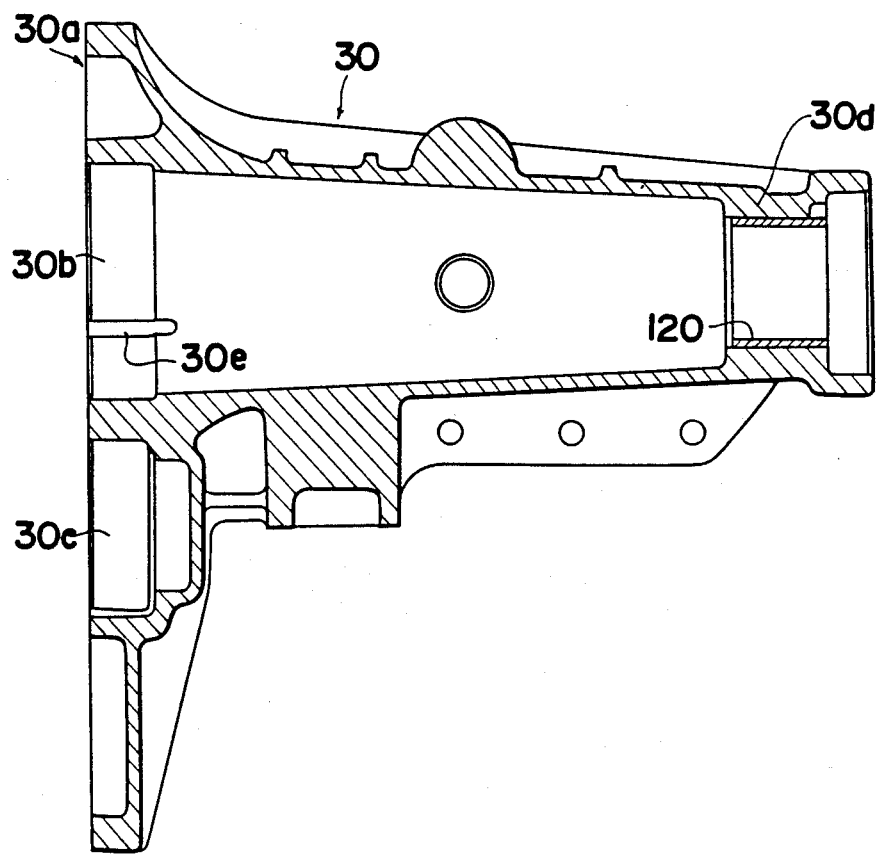
FIG. 5 is a cross section taken along the line V—V in FIG. 4.

Around the outer periphery of the fourth bearing 100 in the forward wall 30a of the above extension housing 30, i.e., in the inner periphery of the upper bearing holding portion 30b, a groove-like oil discharge opening 30e for communicating the interior of the extension housing 30 with the transmission unit housing 2 and an oil introducing opening 30f are respectively formed as shown in FIG. 4. Of the above holes 30e and 30f, the oil discharge opening 30e is formed in a position at a height corresponding to the bearing portion 120 in the rear end portion 30d of the housing 30, while the oil introducing opening 30f is formed at a position higher than that of the oil discharge opening 30e (in the present embodiment, at a position generally confronting the discharge opening 30e, with the fourth bearing 100 held therebetween). In the above case, said oil introducing opening 30f is provided along the upper surface of one of ribs 30g formed to radially extend from the bearing holding portion 30b, and since the groove width or diameter of this oil introducing opening 30f is formed to be larger than that of the oil discharge opening 30e, lubricating oil "b" readily flows into the extension housing 30 through said opening 30f.

By the above construction, when the speed changing gears g1, g2, g3, g5, g6 and g7 are rotated following rotation of the output shaft 9 and counter shaft 11, etc., the lubricating oil "b" contained in the transmission unit housing 2 is picked up from the inner bottom portion of the housing 2 by said gears for being scattered in all directions so as to be fed to the respective lubricating portions within said housing 2. Simultaneously, part of the lubricating oil "b" is led into the oil introducing opening 30f in the outer periphery of the fourth bearing 100 (i.e., the bearing holding portion 30b) at the front wall portion 30a of the housing 2 through the ribs 30g, and further, introduced into the extension housing 30 via the introducing opening 30f. In the above case, since the fourth bearing 100 in the front wall portion 30a is sealed by the seal member 100b, the lubricating oil "b" introduced into the extension housing 30 in the above described manner is collected in the housing 30 and then, part of the bearing portion 120 at the rear end portion of the housing 2 comes to be dipped in the lubricating oil. Thus, when the level of the lubricating oil "b" has exceeded the position corresponding to the height of said bearing portion 120, the lubricating oil is discharged into the housing 20, through the oil discharge opening 30e provided in the front wall 30a of the extension housing 2 in the position corresponding to the height of said bearing portion 120.

Therefore, by the above arrangement, part of the bearing portion 120 at the rear end portion 30d of the housing 2 comes to be dipped at all times in the lubricating oil of a predetermined amount collected within the extension housing 2. Accordingly, it becomes possible to always supply a sufficient amount of oil to the bearing portion 120 provided at the rear end portion 30d of the extension housing 2, and located at the position comparatively spaced from the forward portion of said housing for positive lubrication of the bearing portion 120. Furthermore, in the above construction, since the fourth bearing 100 itself for supporting the output shaft 9 keeps the lubricating oil within the housing 2, it is not necessary to provide any other part such as a shielding member, etc. separately to stop the lubricating oil, and thus, increase in the number of parts and cost can be avoided to that extent.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A gear type transmission unit which comprises a transmission unit housing, a bearing retainer mounted at a front wall portion of said transmission unit housing, and a first bearing held in said bearing retainer for supporting an input shaft, the improvement comprising an upper portion of a bearing holding portion of said bearing retainer, formed to project toward the side of a gear speed changing mechanism, said projecting upper portion formed with an oil groove for introducing lubricating oil to be communicated with an oil hole formed in said bearing retainer for directing the oil and provide for bearing lubrication, further including an extension housing provided at the end portion thereof opposite to the front wall portion of said transmission unit housing, said extension housing including a forward wall and a further bearing provided in said forward wall for supporting an output shaft, said further bearing being composed of a seal bearing, said forward wall of said extension housing being formed with an oil discharge opening in a position around and outer periphery of said seal bearing at a height corresponding to that of a bearing portion in the rear end portion of said extension housing, and also, formed with an oil introducing opening for leading the lubricating oil into the extension housing in a position around the outer periphery of said seal bearing at a height higher than that of said oil discharge opening.

2. A gear type transmission unit as claimed in claim 1, wherein said bearing retainer is fixed to said front wall portion by fixing bolts.

3. A gear type transmission unit as claimed in claim 1, wherein said oil hole is open toward an outer side portion of the first bearing for supporting said input shaft.

4. A gear type transmission unit as claimed in claim 1, wherein a clearance "a" is formed at a side of the first bearing to which the bearing retainer is positioned.

5. A gear type transmission unit as claimed in claim 1, wherein a guide number is further provided at the side of the first bearing.

6. A gear type transmission unit as claimed in claim 1, wherein the rear end portion of said input shaft is formed into a hollow portion, with an output shaft being concentricity coupled to the rear end portion of said input shaft through a second bearing.

7. A gear type transmission unit as claimed in claim 6, wherein said input shaft is formed with communicating holes for communicating a side portion of the first bearing with said hollow portion of the input shaft defined at the rear end portion of said input shaft.

8. A gear type transmission unit as claimed in claim 1, further comprising a counter shaft positioned below an output shaft and supported at a forward end portion by the front wall portion of said transmission unit housing through a further bearing.

* * * * *